(12) United States Patent
Mehrabani

(10) Patent No.: US 11,595,111 B2
(45) Date of Patent: *Feb. 28, 2023

(54) PHASE NOISE REMOVAL IN A NETWORK OF RADIO FREQUENCY (RF) REPEATERS

(71) Applicant: AR & NS Investment, LLC, Newport Coast, CA (US)

(72) Inventor: Alireza Tarighat Mehrabani, Los Angeles, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,168

(22) Filed: Dec. 28, 2021

(65) Prior Publication Data

US 2022/0123825 A1   Apr. 21, 2022

Related U.S. Application Data

(63) Continuation of application No. 16/910,413, filed on Jun. 24, 2020, now Pat. No. 11,283,510.

(51) Int. Cl.
*H04B 7/15* (2006.01)
*H04B 7/155* (2006.01)

(52) U.S. Cl.
CPC ..... *H04B 7/15521* (2013.01); *H04B 7/15535* (2013.01)

(58) Field of Classification Search
CPC ............ H04B 7/15521; H04B 7/15535; H04B 7/15528
See application file for complete search history.

(56) References Cited

U.S. PATENT DOCUMENTS

| 8,346,091 B2 | 1/2013 | Kummetz et al. |
| 9,661,470 B1 | 5/2017 | Bois et al. |

(Continued)

FOREIGN PATENT DOCUMENTS

WO    2020166253 A1    8/2020

OTHER PUBLICATIONS

Final Office Action for U.S. Appl. No. 16/910,537 dated Aug. 23, 2022.

(Continued)

*Primary Examiner* — Hashim S Bhatti
(74) *Attorney, Agent, or Firm* — Chip Law Group

(57) ABSTRACT

A wireless communication system includes a first communication device and a second communication device. The first communication device obtains a plurality of radio frequency (RF) signals corresponding to different communication protocols from a plurality of communication systems. A frequency of each of the plurality of RF signals is upconverted to a different frequency, and a phase noise is introduced in the plurality of RF signals. The plurality of RF signals corresponding to different communication protocols are multiplexed into a mmWave RF signal of a specified frequency and a defined pilot tone along with the mmWave RF signal is transmitted. The second communication device captures the mmWave RF signal having the defined pilot tone over-the-air. At least one RF signal is down converted to a source frequency and the phase noise is estimated in the one extracted RF signal based on the defined pilot tone which is reduced concurrently.

20 Claims, 7 Drawing Sheets

(56) References Cited

U.S. PATENT DOCUMENTS

| | | | |
|---|---|---|---|
| 11,476,894 | B2 | 10/2022 | Mehrabani |
| 2013/0290911 | A1 | 10/2013 | Praphul et al. |
| 2015/0077336 | A1 | 3/2015 | Elangovan |
| 2017/0018831 | A1 | 1/2017 | Henry et al. |
| 2019/0280759 | A1* | 9/2019 | Bennett ................. H04L 5/14 |
| 2020/0052950 | A1* | 2/2020 | Manolakos ........ H04L 5/0048 |
| 2020/0091608 | A1* | 3/2020 | Alpman ................ H03L 7/145 |
| 2020/0366363 | A1* | 11/2020 | Li ..................... H04B 7/15542 |
| 2021/0373919 | A1 | 12/2021 | Davenport et al. |
| 2022/0089179 | A1 | 3/2022 | Sakamoto et al. |

OTHER PUBLICATIONS

Notice of Allowance for U.S. Appl. No. 17/409,128 dated Sep. 21, 2022.

Supplemental Notice of Allowance for U.S. Appl. No. 17/114,437 dated Sep. 19, 2022.

Non-Final Office Action for U.S. Appl. No. 16/910,537 dated May 25, 2022.

Notice of Allowance for U.S. Appl. No. 17/114,437 dated May 4, 2022.

Supplemental Notice of Allowance for U.S. Appl. No. 17/114,437 dated Aug. 3, 2022.

Corrected Notice of Allowance for U.S. Appl. No. 16/910,413 dated Feb. 23, 2022.

Final Office Action for U.S. Appl. No. 16/910,291 dated Jan. 24, 2022.

Final Office Action for U.S. Appl. No. 17/114,437 dated Jan. 14, 2022.

Corrected Notice of Allowance for U.S. Appl. No. 16/910,291 dated Dec. 7, 2022.

Non-Final Office Action for U.S. Appl. No. 17/819,894 dated Dec. 7, 2022.

Notice of Allowance for U.S. Appl. No. 16/910,291 dated Nov. 4, 2022.

* cited by examiner

PHASE NOISE REMOVAL IN A NETWORK OF RADIO FREQUENCY (RF) REPEATERS

CROSS-REFERENCE TO RELATED APPLICATIONS/INCORPORATION BY REFERENCE

This application makes reference to, claims priority to, and claims benefit from, and is a Continuation Application of U.S. patent application Ser. No. 16/910,413, which was filed on Jun. 24, 2020.

The above referenced application is hereby incorporated herein by reference in its entirety.

FIELD OF TECHNOLOGY

Certain embodiments of the disclosure relate to a wireless communication system. More specifically, certain embodiments of the disclosure relate to phase noise removal in a network of radio frequency (RF) repeaters.

BACKGROUND

Conventional communication devices, such as a wireless access point (WAP), are often used to extend the wireless coverage of an existing Wi-Fi signal to access Internet and to increase the numbers of end devices (users) that are capable to use Wi-Fi may connect to the WAP. However, Wi-Fi signals by virtue of the limitation of the Wi-Fi communication protocol have a defined range beyond which the connectivity is lost. Thus, a large number of WAPs or range extenders are used if wireless coverage for Wi-Fi signals are to be extended. Moreover, under ideal conditions, typically 2.4 GHz Wi-Fi supports up to 450 Mbps or 600 Mbps, and 5 GHz Wi-Fi supports up to 1300 Mbps. Thus, the data transmission over such narrow bandwidth is much lower as compared to higher radio frequencies. In case of Bluetooth network, the coverage and data transmission rate is even much less than conventional Wi-Fi network. Currently, certain communication devices, such as Internet-of-Things (IoT) devices depend on high-speed Internet access to the cloud to send sensor data and receive instructions (e.g. artificial intelligence-based processing models) from cloud either directly or via a gateway device. The number of wireless sensors and IoT devices are rapidly increasing with the increase in smart homes, smart offices, enterprises, etc. Existing Wi-Fi standards are unable to handle such massive number of wireless sensors and IoT devices and their quality-of-service (QoS) requirements. Further, some of the communication devices may not support cellular communication or Wi-Fi or may support some other communication protocols (e.g. Bluetooth low energy protocol only). In such cases, it is extremely difficult and technically challenging to support these end user devices having different communication capabilities and connectivity needs. Moreover, if a phase noise is present in radio frequency signals received by a conventional communication device, the performance and sensitivity of a receiver of the conventional communication device is significantly degraded, which is not desirable.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A network of wireless RF repeaters and method for phase noise removal in the network of wireless RF repeaters, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a network of wireless RF repeaters and a method for phase noise removal in the network of wireless RF repeaters. The network of wireless RF repeaters and method of the present disclosure not only enables improvements in data transfer rates between at least two communication devices as compared to existing wireless systems (e.g. conventional wireless local area networks), but also provides a noise-free and an always-connected experience as a result of its multiprotocol feature. The multiprotocol feature of the network of wireless RF repeaters provides a capability to handle different wireless communication protocols concurrently in terms of extending their range as well as increasing bandwidth concurrently while at least reducing (or even removing) phase noise in the network of wireless RF repeaters for high performance wireless content communication.

Phase noise is one of the key factors in communication systems that defines and affects performance of communication systems, for example, spectral integrity in communication systems. Phase noise is commonly used as a measure of frequency stability and has a direct impact on receiver sensitivity. For example, reducing the phase noise increases receiver's sensitivity. In case of multi-carrier orthogonal frequency-division multiplexed (OFDM) signals, if phase noise is too high, then the noise may be converted into adjacent channels of the baseband data, thereby hampering integrity of the communicated content. The network of wireless RF repeaters and method of the present disclosure, by virtue of removing (or at least reducing) phase noise in the network of wireless RF repeaters, also improves the receiver sensitivity of different communication devices (which receives mmWave radio frequency (RF) signal in a specified frequency, such as approximately 60 Ghz) and ensures maintenance of integrity of the information. In the following description, reference is made to the accompanying drawings, which form a part hereof, and in which is shown, by way of illustration, various embodiments of the present disclosure.

Figure 1:
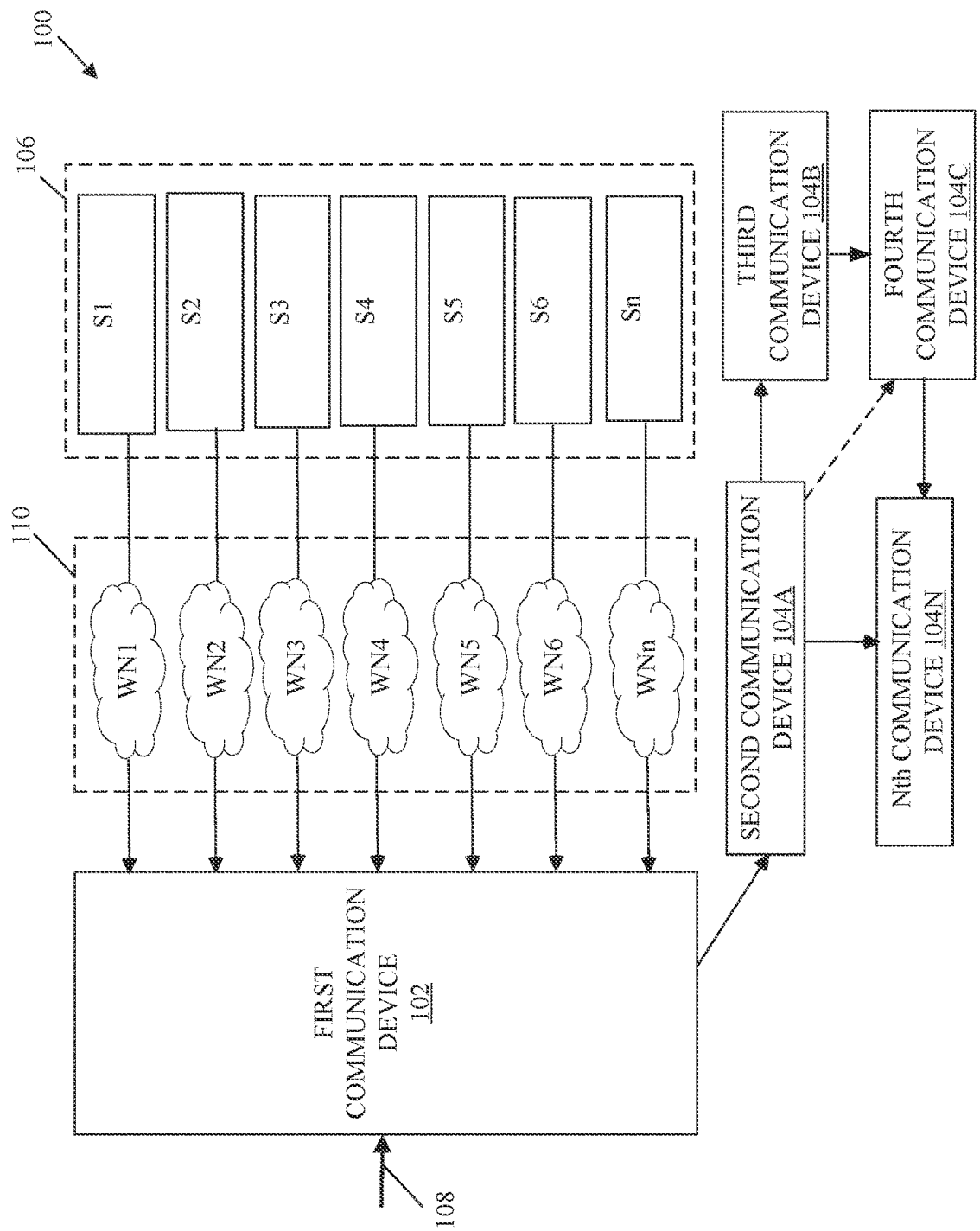
FIG. 1 is diagram illustrating an exemplary network of wireless RF repeaters, in accordance with an exemplary embodiment of the disclosure.

FIG. 1 is diagram illustrating an exemplary network of wireless RF repeaters, in accordance with an exemplary embodiment of the disclosure. With reference to FIG. 1, there is shown an network of wireless RF repeaters 100 that may include a first communication device 102, which may be a central communication device. The network of wireless RF repeaters 100 further includes a plurality of second communication devices 104A to 104N (namely, a second communication device 104A, a third communication device 104B, a fourth communication device 104C, and an Nth communication device 104N). There is further shown a plurality of communication systems 106, a first type of communication network 108, and a plurality of different type of wireless networks 110.

The first communication device 102 may be a networking hardware that acts as a central communication device and a gateway (or a mediator) between the first type of communication network 108 (e.g. Internet) and the plurality of different type of wireless networks 110. The first communication device 102 includes suitable logic, circuitry, and interfaces that may be configured to provide access to the first type of communication network 108 to the plurality of communication systems 106. The plurality of communication systems 106 may be communicatively coupled to the first communication device 102 via the plurality of different type of wireless networks 110. The first communication device 102 may be a multiprotocol wireless range extender device that has a capability to extend range of different RF signals communicated over a plurality of different communication protocols (e.g. Wi-Fi, Bluetooth, Zigbee, cellular signals, and other wireless communication protocols) at the same time. Examples of the first communication device 102 may include, but is not limited to a home gateway device, a fifth generation (5G) modem, a backplane system, an evolved-universal terrestrial radio access-new radio (NR) dual connectivity (EN-DC) device, a 5G wireless access point, an advanced router, a bridge router, a network controller, a fixed wireless access (FWA) device, a server, a firewall device, or a network security device.

Each of the plurality of second communication devices 104A to 104N includes suitable logic, circuitry, and interfaces that may be configured to communicate with the first communication device 102 and one or more other second communication devices of the plurality of second communication devices 104A to 104N. For example, the second communication device 104A may be configured to communicate with the first communication device 102, and one or more of other second communication devices of the plurality of second communication devices 104A to 104N in a parallel transmission or a chain transmission. In an implementation, in order to execute the chain transmission, the second communication device 104A may be a repeater device or a repeater device that may communicate any RF signal received from the first communication device 102 further to the third communication device 104B, which in turn may further communicate the RF signal to the fourth communication device 104C, and so forth. Examples of the each of the plurality of second communication devices 104A to 104N (such as the second communication device 104A) may include, but is not limited to a 5G wireless access point, a multiprotocol wireless range extender device, an evolved-universal terrestrial radio access-new radio (NR) dual connectivity (EN-DC) device, a NR-enabled repeater device, a NR-enabled repeater device, a wireless local area network (WLAN)-enabled device, or a wireless personal area network (WPAN)-enabled device.

Each of the plurality of communication systems 106 (e.g. S1 to Sn) includes suitable logic, circuitry, and interfaces that may be configured to communicate with the first communication device 102 in order to access the first type of communication network 108 (e.g. the Internet) for data communication in a multi-gigabit data rate. The plurality of communication systems 106 may be communicatively coupled to the first communication device 102 via the plurality of different type of wireless networks 110. Each of the plurality of communication systems 106 may be configured to communicate with the first communication device 102 in a plurality of different range of frequencies, such as 2.4 GHz, 5 GHz, or sub 6 GHz bands, which are typically considered as narrow bandwidths. Examples of the plurality of communication systems 106 may include, but is not limited to one or more wireless access points (e.g. a 2.4 GHz based wireless access point and a 5 GHz multiple input multiple output) MIMO capable wireless access point), a camera system, a radar system, an Internet-of-Things (IoT) controller, an IoT device, a Wi-Fi only device, a Bluetooth only device, a Zigbee only device, an orthogonal frequency division multiplexing (OFDM) communication system, a cellular communication system, such as a 2G, 3G, 4G, or 5G NR-enabled communication system.

In an implementation, the first type of communication network 108 may be a wired network, such as an optical fibre connection, which provides high-speed access (e.g. multi-gigabits data rate) to a core network, for example, Internet. In another implementation, the first type of communication network 108 may be a 5G cellular communication network having high data transfer rate (i.e. multi-gigabits data rate).

The plurality of different type of wireless networks 110 (e.g. WN1 to WNn) correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

In operation, the first communication device 102 may be communicatively coupled to the first type of communication network 108. In an implementation, the first communication device 102 may be connected to a modem. In another implementation, the first communication device 102 may be integrated with the modem (i.e. the functionalities of a modem (e.g. a Wi-Fi modem) may be integrated with the first communication device 102). The first communication device 102 may be configured to provide access to the first type of communication network 108 to the plurality of communication systems 106 that are communicatively coupled to the first communication device 102 via the plurality of different type of wireless networks 110. In an example, the plurality of different type of wireless networks 110 may include a first Wi-Fi network operating in a first frequency, a second Wi-Fi network operating in a second frequency that is different from the first frequency, or other low power Wi-Fi network (such as IEEE 802.11ah, also known as Wi-Fi "HaLow" or other variation of Wi-Fi based on IEEE 802.11), a Bluetooth network, a Bluetooth low energy (BLE) network, a wireless sensor network (e.g. adaptive network topology based network), a Zigbee network, a cellular network, an infrared communication, a radio frequency for consumer electronics (RF4CE), a citizens broadband radio service (CBRS) network, or other short-range wireless communication network, such as a wireless personal area network.

The first communication device 102 may be configured to obtain a plurality of radio frequency (RF) signals corresponding to different communication protocols from the plurality of communication systems 106. The plurality of RF signals corresponding to different communication protocols may be obtained via the plurality of different type of wireless networks 110. The different communication protocols may correspond to (i.e. may include) a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, a citizens broadband radio service (CBRS) protocol, or different variations of wireless wide area network (WWAN), wireless local area network (WLAN), or wireless personal area network (WPAN) protocols. In an example, the first communication device 102 may include (i.e. may be realized by) various components, such as RF front-end (transmitter front-ends and receiver front-ends), a digital signal processor, low-noise amplifiers, phase shifters, power combiners, power dividers, power amplifiers, logical control units, a combination of functionalities of modems, a phased lock loop (PLL) circuits, and mixers.

In accordance with an embodiment, the first communication device 102 may be further configured to upconvert a frequency of each of the plurality of RF signals to a different frequency. The upconversion introduces a phase noise in the plurality of RF signals. The first communication device 102 may be configured to use an upconverter for the upconversion. In an example, data received over the plurality of RF signals may be converted in the form of bits, before transmission of such bits over-the-air using a mmWave RF signal by manipulation of frequency and one or more other signal characteristic, such as amplitude, and/or phase, of the mmWave RF signal. In an example, higher order modulation schemes, such as 16QAM, 64QAM, may be used to allow more information to be packed into a single radio wave, which improves spectral efficiency of wireless communication.

In accordance with an embodiment, the first communication device 102 may be further configured to generate mmWave RF waveform of a specified frequency. In accordance with an embodiment, the first communication device 102 may be further configured to map and align the plurality of RF signals corresponding to different communication protocols in the mmWave RF signal (e.g. the generated mmWave RF waveform) in accordance to a number of source antennas from which the plurality of RF signals are obtained. For example, if a communication system of the plurality of communication systems 106 has two antennas, then these two antennas may be mapped to two corresponding RF signals in the mmWave RF signal. An example of mapping is shown and described in FIG. 3.

In accordance with an embodiment, the plurality of RF signals may be aligned with different spacing. In an example, the plurality of RF signals may be placed next to each other in the frequency domain, minimizing the frequency gaps between different waveforms in the frequency domain. In another example, the plurality of signals are placed with some gap or guard interval (or guard band) in between each of the plurality of signals in order to ease the selection filtering needed to select and disaggregate these RF waveforms. In another example, as a large amount of spectrum is available over the mmWave RF signal of the specified frequency, the plurality of RF signals may be placed with suitable large gaps in between. This spaced alignment of each RF signal in the mmWave RF signal may be greater than a defined threshold and may be utilized for purpose of minimizing receiver sensitivity and signal degradation due to other interfering signals operating in the same frequency bands. For example, in a conventional scenario, assuming, there are four RF waveforms from systems S1, S2, S3, S4, where each RF waveform may occupy 400 MHz spectrum. If all four streams (RF waveforms or signals) are packed and aligned next to each other in frequency domain, a bandwidth of about 1.6 GHz will be occupied. In such conventional scenario, if a wideband interfering signal is encountered, all four streams (i.e. all four RF waveforms) may be impacted (and overlapped) at same time, and hence may likely disrupt communication link. In some embodiments, the four RF waveforms if placed in frequency domain with about 1 GHz gap in between adjacent streams (RF waveforms). In this case, the presence or appearance of a wideband interfering signal would only overlap/impact one out of four streams (i.e. one of the four RF waveforms). Given the MIMO and channel coding applied on the four streams (i.e. the four RF waveform), there is a higher probability the original information stream can be recovered at receiver side (e.g. end-user devices), given the redundancy in the correction capability embedded into the streams being transmitted over the air.

The first communication device 102 may be further configured to merge the obtained plurality of RF signals corresponding to different communication protocols into the mmWave RF signal of the specified frequency. In an example, the plurality of RF signals upconverted at different frequency are multiplexed in a frequency division multiplexing. In another example, the plurality of RF signals at different frequency are multiplexed in a time-division multiplexing. The first communication device 102 may be further configured to insert a defined pilot tone into the mmWave RF signal of the specified frequency. The defined frequency may be distinct from any other upconverted frequency of the plurality of RF signals or the specified frequency.

The first communication device 102 may be further configured to transmit the mmWave RF signal of the specified frequency having the defined pilot tone to the second communication device 104A. In an implementation, the first communication device 102 may be further configured to provide the mmWave RF signal of the specified frequency having the defined pilot tone to the plurality of second communication devices 104A to 104N in a chain transmission. In another implementation, the first communication device 102 may be further configured to provide the mmWave RF signal of the specified frequency having the defined pilot tone to the plurality of second communication devices 104A to 104N in a parallel transmission. In an implementation, the specified frequency of the mmWave RF signal is in the range of 10 gigahertz (GHz) to 300 GHz. In another implementation, the specified frequency of the mmWave RF signal is in the range of 55 gigahertz (GHz) to 65 GHz. In yet another implementation, the specified frequency of the mmWave RF signal is 60 gigahertz (GHz).

In accordance with an embodiment, each of the plurality of RF signals communicated over a corresponding type of wireless network of the plurality of different type of wireless networks has a defined communication range. A coverage of the plurality of RF signals corresponding to the different communication protocols is extended beyond the defined communication range based on the transmit of the mmWave RF signal of the specified frequency that includes the plurality of RF signals and the defined pilot tone.

In accordance with an embodiment, the second communication device 104A may be configured to capture the mmWave RF signal of the specified frequency having the defined pilot tone over-the-air (OTA). For example, the second communication device 104A may be configured to detect and capture a 60 GHz RF signal having the upconverted plurality of RF signals and the defined pilot tone. The second communication device 104A may be further configured to extract at least one RF signal from the plurality of RF signals corresponding to different communication protocols from the captured mmWave RF signal of the specified frequency. In accordance with an embodiment, the second communication device 104A may be further configured to extract, from the transmitted mmWave RF signal, a wireless wide area network signal, a wireless local area network signal, a wireless personal area network signal, or a combination thereof that corresponds to the plurality of RF signals.

The second communication device 104A may be further configured to down-convert at least the one extracted RF signal to a source frequency that is same as the frequency of a corresponding RF signal of the plurality of RF signals obtained from the plurality of communication systems 106. The second communication device 104A may be further configured to reduce the phase noise in at least the one extracted RF signal concurrently at the down-convert based on a reference of the defined pilot tone. In order to reduce the phase noise, the second communication device 104A may be further configured to estimate the phase noise in at least the one extracted RF signal based on the reference of the defined pilot tone. For example, as the signal characteristics of the defined pilot tone may be distinct and known, the phase difference detected for the pilot tone, is used as reference to subtract the phase noise from the one extracted RF signal when such extracted RF signal is in frequency domain, to remove or at least significantly reduce the phase noise. In a case where the extracted RF signal is in the time domain, the estimated phase noise may be multiplied to the extracted RF signal. The second communication device 104A by virtue of removing (or at least reducing) phase noise in at least the one extracted RF signal in the network of wireless RF repeaters 100 also improves its receiver sensitivity that receives the mmWave RF signal in the specified frequency, and ensures integrity of the information present in the one extracted RF signal of the mmWave RF signal. The second communication device 104A may be further configured to utilize at least the one extracted RF signal with reduced phase noise for further distribution to one or more end-user devices.

The second communication device 104A may be further configured to distribute the mmWave wave RF signal of the specified frequency through mmWave mesh beam networking to increase coverage for an always-connected experience. Similar to the second communication device 104A, each communication device of the plurality of second communication devices 104A to 104N is configured to extract, from the mmWave RF signal, at least one of the merged plurality of RF signals for consumption, thereby increase coverage of the plurality of RF signals for an always-connected experience. For example, a user operating an end-user device may communicate with the first communication device 102 or the second communication device 104A to receive a data item over a ZigBee network from the first communication device 102 (or the second communication device 104A) in a first room. The user carrying the end-user device may move to another room and may get connected with the third communication device 104B. However, the end-user device may continue to receive the data item from the third communication device 104B (e.g. based on extraction of the original ZigBee signal by the third communication device 104B).

In some embodiments, multi-stream gain adjustment or equalization may be applied on the plurality of RF signals extracted from the mmWave RF signal throughout a chain of repeaters (i.e. the plurality of second communication devices 104A to 104N). This relative gain adjustment may be applied in one (e.g. the second communication device 104A or the plurality of second communication devices 104A to 104N). Such gain adjustments may be applied on the incoming RF waveforms/signals or outgoing waveforms/signals. In an example, the relative gain adjustment/equalization may be applied for different purposes and/or due to different conditions, for example, to compensate for gain imbalances throughout the chain. For example, streams/RF signals received by different antennas of second communication device 104A (e.g. a repeater device) from one or more of the plurality of end-user devices during uplink to the first communication device 102 (Node B towards Node A), may have very different relative signals levels. Aggregating these received signals next to each other in the frequency domain, may degrade the signal quality of weaker signals, due to leakage of out-of-band emissions of comparatively stronger signals. To address this issue, some relative gain equalization may be applied at the second communication device 104A, before aggregating the RF signals from the end-user devices and sending them up upstream towards the first communication device 102 (or another repeater device which then transmits to the first communication device 102). In some embodiments, the relative gain values may be coordinated, or shared with, or may be set by Node A (i.e. the first communication device 102). This enable the baseband processing units (MIMO pre-coding, decoding) to take in account such gain adjustment (which is not part of actual channel propagation between the second communication device 104A and an end-user device, such as Node B) in their MIMO processing.

In some embodiments, the plurality of second communication devices 104A to 104N may not perform any digital processing, demodulation, or packet processing. All digital and baseband processing for communication to and from a plurality of end-user devices (e.g. standalone user equipment (UEs)) are performed centrally at the first communication device 102. The plurality of second communication devices 104A to 104N may not perform any waveform processing (e.g. demodulation), hence keeping the latency through the chain of the plurality of second communication devices 104A to 104N (e.g. repeater or relay devices) close to zero (e.g. orders of 10 s of nanosecond). In other words, nearly zero latency is introduced to the plurality of RF signals, allowing the first communication device 102 and the plurality of end-user devices to mitigate very small latencies through the repeater chains (i.e. the plurality of second communication devices 104A to 104N). For example, the first communication device 102 may be Node A, which may be a central unit (e.g. a central multiprotocol access point), and Nodes B/B' may be complete standalone UEs communicatively coupled to the Node A directly, or to Wi-Fienabled devices (e.g. repeater devices or second communication devices) linked to multiprotocol access point Node A. All user/network management functions as well as digital processing of signals/streams may performed by the Node A through its embedded digital unit (e.g. a digital signal processor). The plurality of second communication devices 104A to 104N (e.g. repeater devices) may not perform demodulation/re-modulation of data streams. Although, the second communication device 104A or the third communication device 104B acts as an access point (or small cell) that provides access to end users Node B/B', and also provides coverage to end users at a propagation frequency of sub 6 GHz that is less than the specified frequency of the mmWave Rf signal, all baseband/digital processing to support and maintain connections to the Nodes B/B' may be performed and managed by the Node A (i.e. the first communication device 102).

Figure 2A:
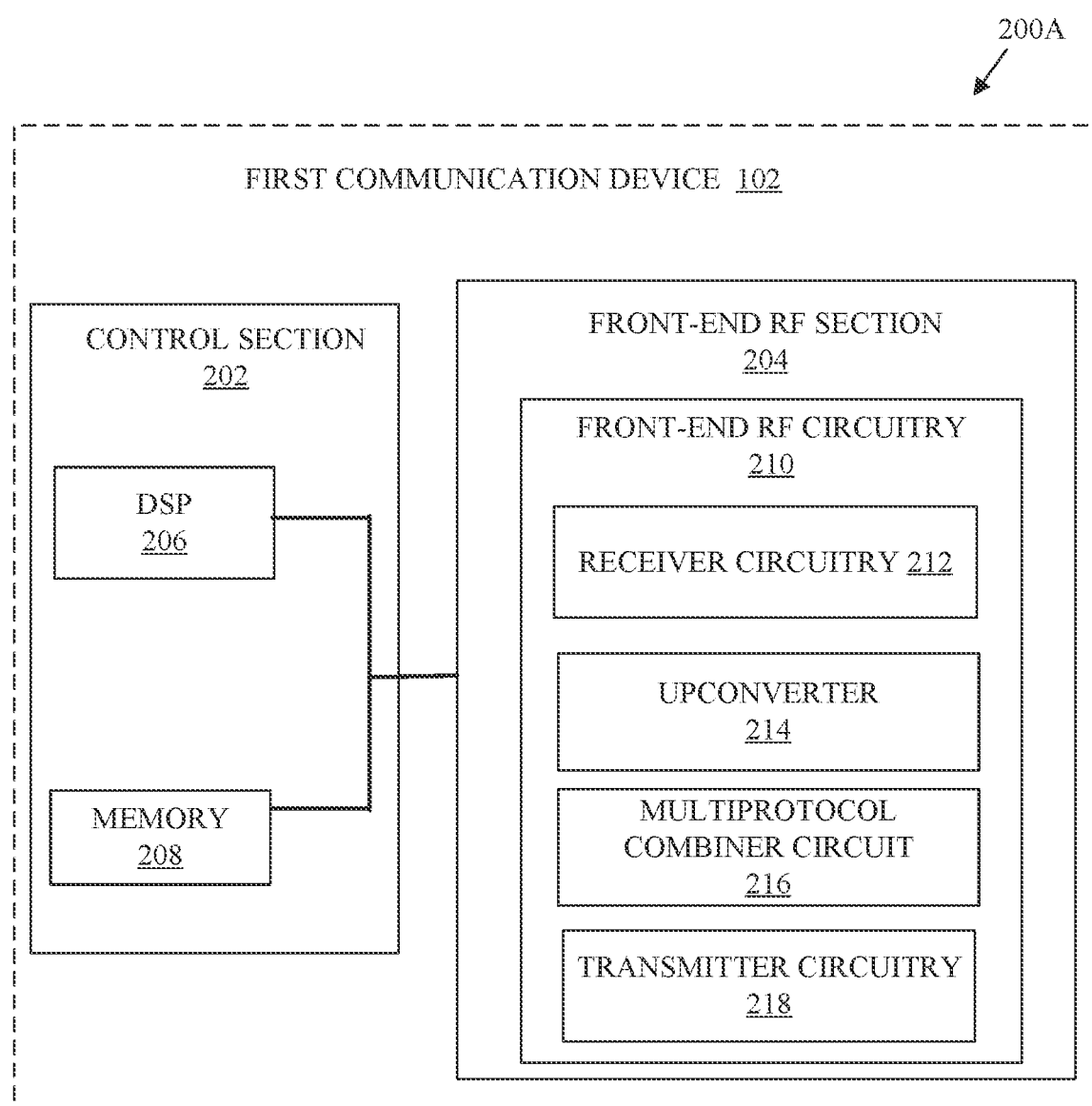
FIG. 2A is a block diagram that illustrates various components of an exemplary first communication device of a network of wireless RF repeaters, in accordance with an exemplary embodiment of the disclosure.

FIG. 2A is a block diagram that illustrates various components of an exemplary first communication device of a network of wireless RF repeaters, in accordance with an exemplary embodiment of the disclosure. FIG. 2A is explained in conjunction with elements from FIG. 1. With reference to FIG. 2A, there is shown a block diagram 200A of the first communication device 102. The first communication device 102 may include a control section 202 and a front-end RF section 204. The control section 202 may include a digital signal processor (i.e. a DSP 206) and a memory 208. The control section 202 may be communicatively coupled to the front-end RF section 204. The front-end RF section 204 may include front-end RF circuitry 210. The front-end RF circuitry 210 may further include a receiver circuitry 212, an upconverter 214, a multiprotocol combiner circuit 216, and a transmitter circuitry 218.

The DSP 206 include suitable logic, circuitry, and/or interfaces configured to control the front-end RF circuitry 210. The first communication device 102 may be a programmable device, where the DSP 206 may execute instructions stored in the memory 208. Example of the implementation of the DSP 206 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. Examples of implementation of the memory 208 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF circuitry 210 may include the receiver circuitry 212, the upconverter 214, the multiprotocol combiner circuit 216, and the transmitter circuitry 218. The receiver circuitry 212 may be configured to receive (or obtain) a plurality of RF signals corresponding to different communication protocols via the plurality of different type of wireless networks 110. For example, the receiver circuitry 212 may be configured to receive Wi-Fi signals, for example, in 2.4 GHz o 5 GHz, Bluetooth signals, Zigbee signals, infrared signals, or other types of RF signals, such as wireless wide area network signals over one or more frequencies, wireless local area network signals, or wireless personal area network signals, or a combination thereof, from the plurality of communication systems 106. In an example, the receiver circuitry 212 may include a cascading receiver chain comprising various components (e.g., an antenna array, a set of low noise amplifiers (LNA), a set of receiver front end phase shifters, and a set of power combiners) for the signal reception (not shown for brevity).

The upconverter 214 may be configured to upconvert a frequency of each of the plurality of RF signals to a different frequency. Typically, it is observed that the upconversion introduces a phase noise in the plurality of RF signals. In some embodiments, the upconverter 214 may be a phased locked loop (PLL) circuit may be provided in the first communication device 102, which acts as a local oscillator and may be associated with the transmitter circuitry 218 to facilitate up conversion of each input RF signals to a different frequency before transmission.

The multiprotocol combiner circuit 216 may be configured to merge the obtained plurality of RF signals corresponding to different communication protocols into a mmWave RF signal of a specified frequency. In an implementation, the multiprotocol combiner circuit 216 may be configured to merge the obtained plurality of RF signals corresponding to different communication protocols under the control of the DSP 206 (e.g. when an instruction to merge is communicated by the DSP 206 to the multiprotocol combiner circuit 216, via a system bus (not shown). The obtained plurality of RF signals corresponding to different communication protocols may be multiplexed (Mux) into the mmWave RF signal of the specified frequency (e.g. 60 GHz). The multiprotocol combiner circuit 216 may be further configured to insert one pilot tone of a defined frequency into the mmWave RF signal of the specified frequency. The defined frequency may be distinct and different from any other upconverted frequency of the plurality of RF signals or the specified frequency.

The transmitter circuitry 218 may be configured to transmit the mmWave RF signal of the specified frequency, such as the mmWave RF signal, to the second communication device 104A. In an implementation, the transmitter circuitry 218 may be configured to transmit the mmWave RF signal of the specified frequency under the control of the DSP 206 (e.g. when an instruction to transmit is communicated by the DSP 206 to the transmitter circuitry 218, via the system bus. In an example, transmitter circuitry 218 may include a cascading transmitter chain comprising various components, such as a set of power dividers, a set of transmitter front end phase shifters, a set of power amplifiers (PA), and an antenna system for the transmission of the mmWave RF signal in the specified frequency. In an example, the mmWave RF signal in the specified frequency may be distributed to other communication devices of the plurality of second communication devices 106 as a beam to form a mmWave beam mesh network. In accordance with an embodiment, the front-end RF circuitry 210 may receive input RF signals and transmit the one or more mmWave RF signals in accordance with multiple-input multiple-output (MIMO) reception and transmission.

Figure 2B:
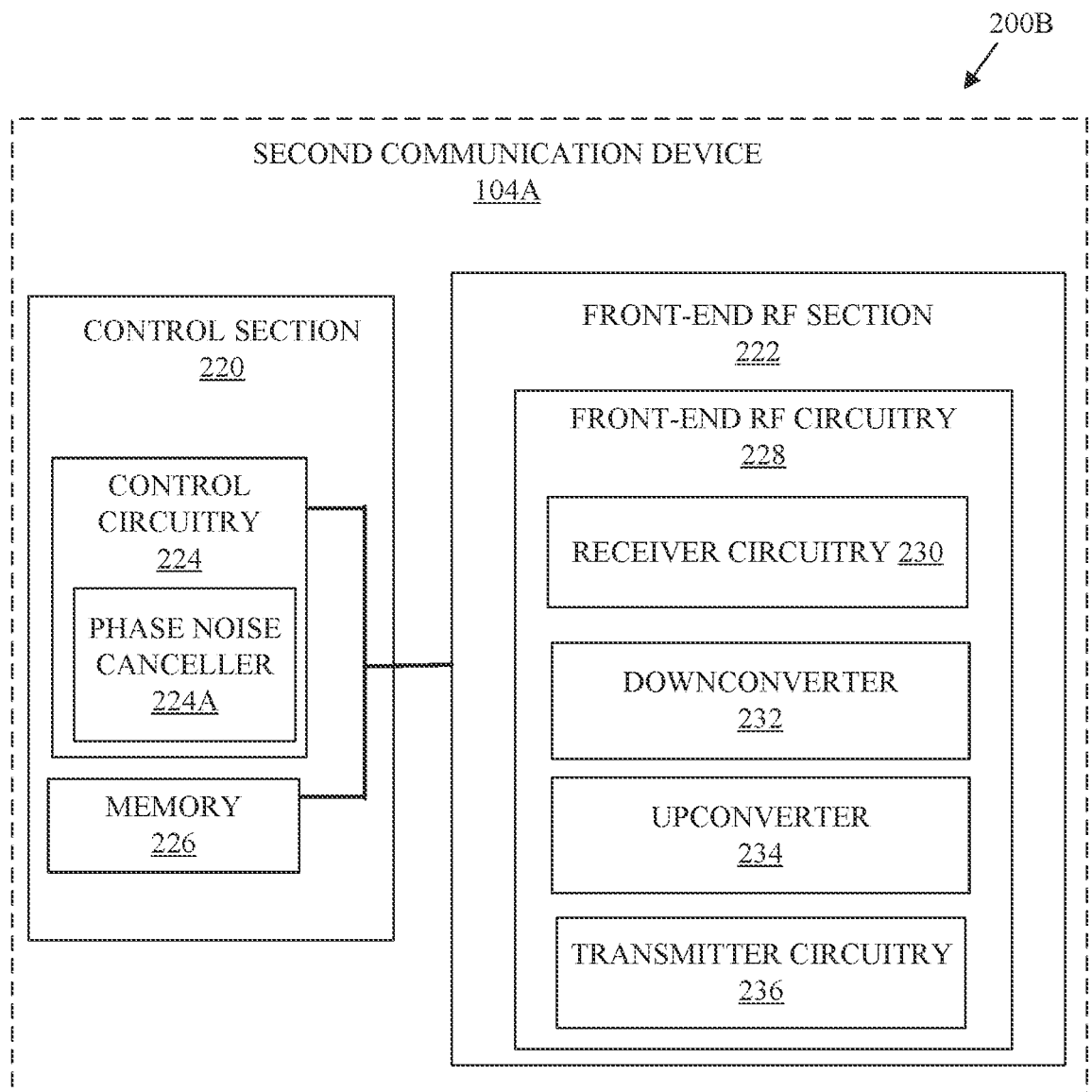
FIG. 2B is a block diagram that illustrates various components of an exemplary second communication device of a network of wireless RF repeaters, in accordance with an exemplary embodiment of the disclosure.

FIG. 2B is a block diagram illustrating various components of an exemplary second communication device of a network of wireless RF repeaters, in accordance with an exemplary embodiment of the disclosure. FIG. 2B is explained in conjunction with elements from FIG. 1 and FIG. 2A. With reference to FIG. 2B, there is shown a block diagram 200B of the second communication device 104A. The second communication device 104A may include a control section 220 and a front-end RF section 222. The control section 220 may include control circuitry 224 and a memory 226. The control section 220 may be communicatively coupled to the front-end RF section 222. The front-end RF section 222 may include front-end RF circuitry 228. The front-end RF circuitry 228 may further include a receiver circuitry 230, a downconverter 232, an upconverter 234, and a transmitter circuitry 236.

The control circuitry 224 may include a phase noise canceller 224A. The phase noise canceller 224A may be configured to estimate phase noise in one or more extracted RF signals from the captured mmWave RF signal of the specified frequency. The phase noise canceller 224A may be configured to estimate the phase noise based on a reference of the defined pilot tone present in the captured mmWave RF signal of the specified frequency. In an example, the frequency of the pilot tone may be distinct and may be known to the second communication device 104A. Thus, by estimating an amount of deviation (or fluctuations) in the phase, amplitude, or other signal characteristics of the pilot tone, an estimate of the phase noise introduced in the mmWave RF signal (i.e. the upconverted RF signals in the mmWave RF signal) may also be estimated. The control circuitry 224 may be configured to extract at least one RF signal from the plurality of RF signals corresponding to different communication protocols from the captured mmWave RF signal of the specified frequency without performing any demodulation or digital signal processing to minimize latency. The phase noise canceller 224A may be configured to reduce the phase noise in at least the one extracted RF signal concurrently at the down-convert based on a reference of the defined pilot tone.

The memory 226 may be configured store values of phase noise estimation in the upconverted plurality of RF signals present in the mmWave RF signal. Examples of the implementation of the memory 226 may be same as that of the memory 208.

The front-end RF circuitry 228 includes the receiver circuitry 230, the downconverter 232, the upconverter 234, and the transmitter circuitry 236. The front-end RF circuitry 228 supports multiple-input multiple-output (MIMO) operations, and may be configured to execute MIMO communication with a plurality of end-user devices or the one or more communication systems of the plurality of communication systems 106. The MIMO communication is executed at a sub 6 gigahertz (GHz) frequency that is less than the specified frequency of the mmWave signal. The mmWave signal is received at specified frequency (e.g. 60 GHz), whereas the MIMO communication is executed at a different frequency, such as sub 6 gigahertz, with the plurality of end-user devices or the one or more communication systems of the plurality of communication systems 106. This mode of operation is beneficial and advantageous, given that the propagation at lower frequency (sub 6 GHz) results in rich scattering channel response, which leads to better MIMO capacity and MIMO performance. The downconverter 232 may be configured to down-convert at least the one extracted RF signal to a source frequency that is same as the frequency of a corresponding RF signal of the plurality of RF signals obtained from the plurality of communication systems 106. Similarly, the downconverter 232 may be configured to down-convert all the plurality of RF signal to its original source frequency (e.g. 5 GHz, 2.5 GHz and the like). In some embodiments, the upconverter 234 may be configured to upconvert the RF signals received from the end-user devices for further distribution to the first communication device 102 or relay to other second communication devices, such as the third communication device 104B.

The transmitter circuitry 236 may be configured to further forward the received mmWave RF signal of the specified frequency to the third communication device 104B. The transmitter circuitry 236 may be configured to communicate with the plurality of end-user devices. In an implementation, the transmitter circuitry 236 may be configured to transmit the mmWave RF signal of the specified frequency under the control of the control circuitry 224. Examples of implementation of the transmitter circuitry 236 may be similar to that of the transmitter circuitry 218 of FIG. 2A.

Figure 3:
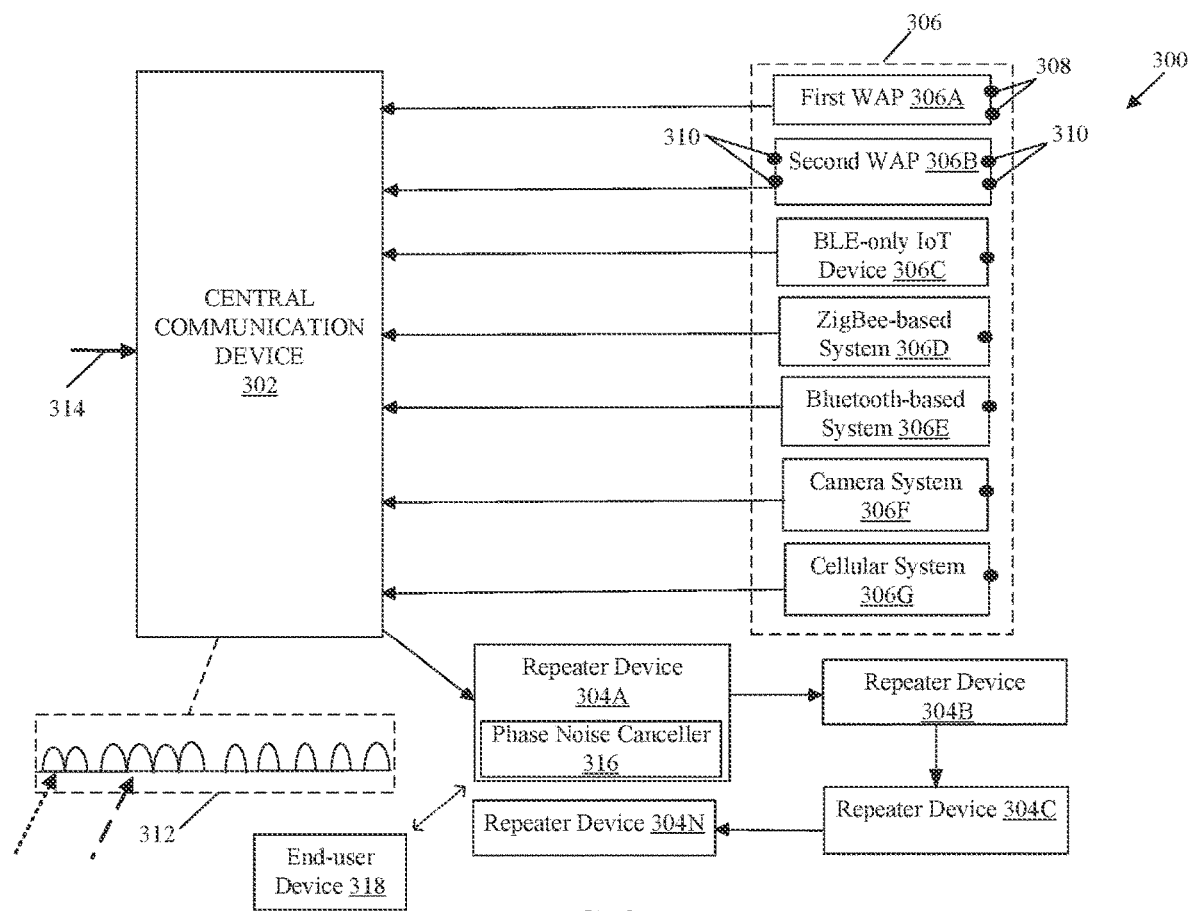
FIG. 3 is diagram illustrating an exemplary scenario for phase noise removal in a network of wireless RF repeaters, in accordance with an exemplary embodiment of the disclosure.

FIG. 3 is diagram illustrating an exemplary scenario for phase noise removal in a network of wireless RF repeaters, in accordance with an exemplary embodiment of the disclosure. FIG. 3 is explained in conjunction with elements from FIGS. 1, 2A, and 2B. With reference to FIG. 3, there is shown an exemplary scenario 300 of a network of wireless RF repeaters that include a central communication device 302 and a plurality of repeater devices 304A to 304N. There is further shown a plurality of communication systems 306, which includes a first Wi-Fi access point 306A, a second Wi-Fi access point 306B, a Bluetooth low energy (BLE)-only IoT device 306C, a ZigBee-based system 306D, a Bluetooth-based system 306E, a camera system 306F, and a cellular system 306G. The first Wi-Fi access point 306A may have two antennas 308 and may operate in 2.4 GHz frequency (i.e. network band) and the second Wi-Fi access point 306B may have a MIMO-based antenna system 310 and may operate in 5 GHz frequency. There is further shown a mmWave RF signal 312 of a specified frequency, such as 60 GHz frequency, as an output of the central communication device 302 and a wired medium, such as a fiber-optic cable 314, connected to the central communication device 302. There is also shown an end-user device 318 communicatively coupled to the repeater device 304A.

In accordance with the exemplary scenario 300, the central communication device 102 corresponds to the first communication device 102 and the plurality of repeater devices 304A to 304N corresponds to the plurality of second communication devices 104A to 104N. The plurality of communication systems 306 may be an example of the plurality of communication systems 106. In the exemplary scenario 300, the central communication device 302 may be communicatively coupled to the fiber-optic cable 314, for example, for accessing core network (e.g. Internet).

In accordance with an embodiment, the central communication device 302 may be configured to obtain a plurality of RF signals from the plurality of communication systems 306. For example, first Wi-Fi signals may be obtained from the first Wi-Fi access point 306A. Similarly, second Wi-Fi signals may be obtained from the second Wi-Fi access point 306B; a BLE signal may be obtained from the BLE-only IoT device 306C, a ZigBee signal may be obtained from the ZigBee-based system 306D, a Bluetooth signal may be obtained from the Bluetooth-based system 306E, a RF signal carrying video content may be obtained from the camera system 306F, and a cellular signal (e.g. a LTE or even a NR signal or a mmWave signal) may be obtained from the cellular system 306G.

In accordance with an embodiment, the central communication device 302 may be further configured to upconvert a frequency of each of the plurality of RF signals to a different frequency. In an implementation, in certain scenarios, the first Wi-Fi signals from the first Wi-Fi access point 306A and the second Wi-Fi signals from the second Wi-Fi access point 306B may operate in same frequency (i.e. the first frequency and the second frequency may be same, for example, 5 GHz). In such a case, at least one of the the first Wi-Fi signals and the second Wi-Fi signals is upconverted to a different frequency. In another scenario, the camera system 306F and the second Wi-Fi access point 306B may operate in same WLAN frequency (e.g. 5 GHz). In such a case, only the RF signal carrying video content from the camera system 306F may be upconverted to 5.2 GHz frequency. Alternatively, in another implementation, each of the first Wi-Fi signals (e.g. 2.4 GHz frequency), the second Wi-Fi signals (e.g. 5 GHz), the BLE signal, the ZigBee signal, the Bluetooth signal, the RF signal, and the cellular signal may be upconverted to a different frequency so that each RF signal received from each communication system of the plurality of communication systems 306 has a different upconverted frequency. The upconversion introduces a phase noise in the plurality of RF signals.

In accordance with an embodiment, the central communication device 302 may be further configured to map and align the plurality of RF signals corresponding to different communication protocols in accordance to a number of source antennas from which the plurality of RF signals is obtained. Examples of the different communication protocols include, but is not limited to Wi-Fi 2.4 GHz, 3.6 GHz, 5 GHz (i.e. IEEE 802.11 protocol and variations thereof), Zigbee protocol, Bluetooth protocol, BLE, or other protocols that typically operate in the range 1 MHz to 6 GHz or even higher). As the first Wi-Fi access point 306A have two antennas 308, thus, the two antennas 308 may be mapped to two corresponding signals (mapping indicated by a short-dash arrow in the mmWave RF signal 312) in the mmWave RF signal 312 of 60 GHz. Similarly, the second Wi-Fi access point 306B that may have the MIMO-based antenna system 310 (e.g. four antennas) may be mapped to four corresponding signals (mapping indicated by a long-dash arrow in the mmWave RF signal 312) in the mmWave RF signal 312 of 60 GHz. Similarly, one antenna of other systems may correspond to one corresponding signal in the mmWave RF signal 312.

The central communication device 302 may be further configured to merge the obtained plurality of RF signals corresponding to different communication protocols into the mmWave RF signal 312 of 60 GHz frequency. After the up-conversion and the mapping, the plurality of RF signals at different frequency are multiplexed to form a single beam of RF signal (i.e. the mmWave RF signal 312 of 60 GHz frequency). In an example, the plurality of RF signals at different frequency are multiplexed in a frequency division multiplexing. In another example, the plurality of RF signals at different frequency are multiplexed in a time-division multiplexing.

In an implementation, the central communication device 302 may be further configured to insert a defined pilot tone into the mmWave RF signal 312. The defined pilot tone may have a distinct frequency. The central communication device 302 may be further configured to transmit the mmWave RF signal 312 (having the defined pilot tone) at 60 GHz frequency to the repeater device 304A. The repeater device 304A may be configured to capture the mmWave RF signal 312 of 60 GHz frequency having the defined pilot tone over-the-air. The repeater device 304A may be configured to extract one or more RF signals (Wi-Fi signals and BLE signals) from the plurality of RF signals corresponding to different communication protocols from the captured mmWave RF signal 312. The repeater device 304A may be configured to down-convert the one or more extracted RF signals to a source frequency (i.e. original frequency of 5 GHz or 2.5 GHz) that is same as the frequency of a corresponding RF signal of the plurality of RF signals obtained from the plurality of communication systems 306. The phase noise canceller 316 may be configured to reduce the phase noise in the one or more extracted RF signals concurrently at the time of down conversion based on a reference of the defined pilot tone present in the mmWave RF signal 312. The repeater device 304A may be configured to utilize the one or more RF signals with reduced phase noise for further distribution to one or more end-user devices, such as the end-user device 318. In an embodiment, only one repeater device, such as the repeater device 304A, removes the phase noise, and then further further transmit the mmWave RF signal 312 at 60 GHz frequency without any phase noise to the repeater device 304B, which then further transmits to the repeater device 304C, and so forth in a chain transmission to extend the coverage of the plurality of RF signals (that are noise-free) corresponding to different communication protocols. In another embodiment, each of the plurality of repeater devices 304A to 304N may have a phase noise canceller similar to the phase noise canceller 316 of the repeater device 304A. In such a case, the repeater device 304A relays the mmWave RF signal 312 to other repeater devices of the plurality of repeater devices 304A to 304N, while removes phase noise of RF signals only for those end-user devices or communication systems that are attached (i.e. commutatively coupled) to the repeater device 304A.

In another implementation, the central communication device 302 may be further configured to transmit the mmWave RF signal 312 at 60 GHz frequency concurrently to the repeater device 304A and the repeater device 304B. Thereafter, the repeater device 304A may be configured to further transmit the mmWave RF signal 312 at 60 GHz frequency to the repeater device 304C and the repeater device 304N in a parallel transmission. The central communication device 302 may be further configured to distribute the mmWave RF signal 312 at 60 GHz frequency in a chain transmission, a parallel transmission, or a combination of the parallel transmission and the chain transmission as a mesh network such that all the original RF signals (i.e. any of the plurality of RF signals) previously merged into the mmWave RF signal 312 are available everywhere in a defined area (e.g. an enterprise area) to be consumed by multiple end-user devices present in the defined area.

In an example, certain end-user devices, such as the end-user device 318, may be communicatively coupled to the repeater device 304A. Thus, the repeater device 304A may be configured to capture the mmWave RF signal 312 of 60 GHz frequency over-the-air and extract, from the mmWave RF signal 312, the first Wi-Fi signals in upconverted form and down convert the extracted first Wi-Fi signals to recover the original first Wi-Fi signals. The phase noise canceller 316 of the repeater device 304A may be configured to remove phase noise from the first Wi-Fi signals during down conversion using the reference of the defined pilot tone. The repeater device 304A may be at a distance from the first Wi-Fi access point 306A that is beyond the usual communication range (e.g. usual range of 2.4 GHz Wi-Fi is approximately 40 to 50 meters indoors and 92 to 100 meters outdoors) of the first Wi-Fi access point 306A. The provisioning of the first Wi-Fi signals in the form of the mmWave RF signal 312 to the repeater device 304A improves the transmission speed and data rate and reduces latency and at the same time enables each individual end-user device, such as the end-user device 318, to quickly access its data stream (almost near zero latency) over the extracted first Wi-Fi signals via the repeater device 304A. Similarly, end-user devices having 5 GHz capable antenna may access its data stream over the extracted second Wi-Fi signals (e.g. of 5 GHz) provided by the repeater device 304A. Further, end-user devices having Bluetooth-only capability may connect to the repeater device 304 to access its data (meant for only the designated device) over the BLE signal extracted by the repeater device 304A. Moreover, in some embodiments, the repeater device 304A itself may be an end-user device, such as the smart television. In such a case, a data stream from Internet (i.e. the first type of communication network 108 (FIG. 1)) may be accessible directly over the mmWave RF signal 312 in a high data rate (a multi-gigabit data rate, such as greater than 5 Gbps or even greater than 8 Gbps), whereas the smart television that acts as the repeater device 304B may also extract other RF signals merged in the mmWave RF signal 312 and provide to other end-user devices, such as the end-user device 318, wirelessly connected to the smart television. Similar to the repeater device 304B, the other repeater devices, such as repeater device 304B, the repeater device 304C, or the repeater device 304N, may capture the mmWave RF signal 312 at 60 GHz frequency, extract one or more of a wireless local area network signal, a wireless personal area network signal, or a combination thereof, from the mmWave RF signal 312, remove phase noise from the extracted signals, and provide noise-free RF signals to corresponding end-user devices communicatively coupled to corresponding repeater devices (i.e. the repeater device 304B, or the repeater device 304C, or the repeater device 304N). Thus, a high-performance and noise-free wireless content (e.g. data, audio, and video including 4K or 8K video) communication is achieved for always connected experience in significantly improved data rates with reduced latency and phase noise as compared to conventional Wi-Fi or "WiGig" communication systems.

Figure 4:
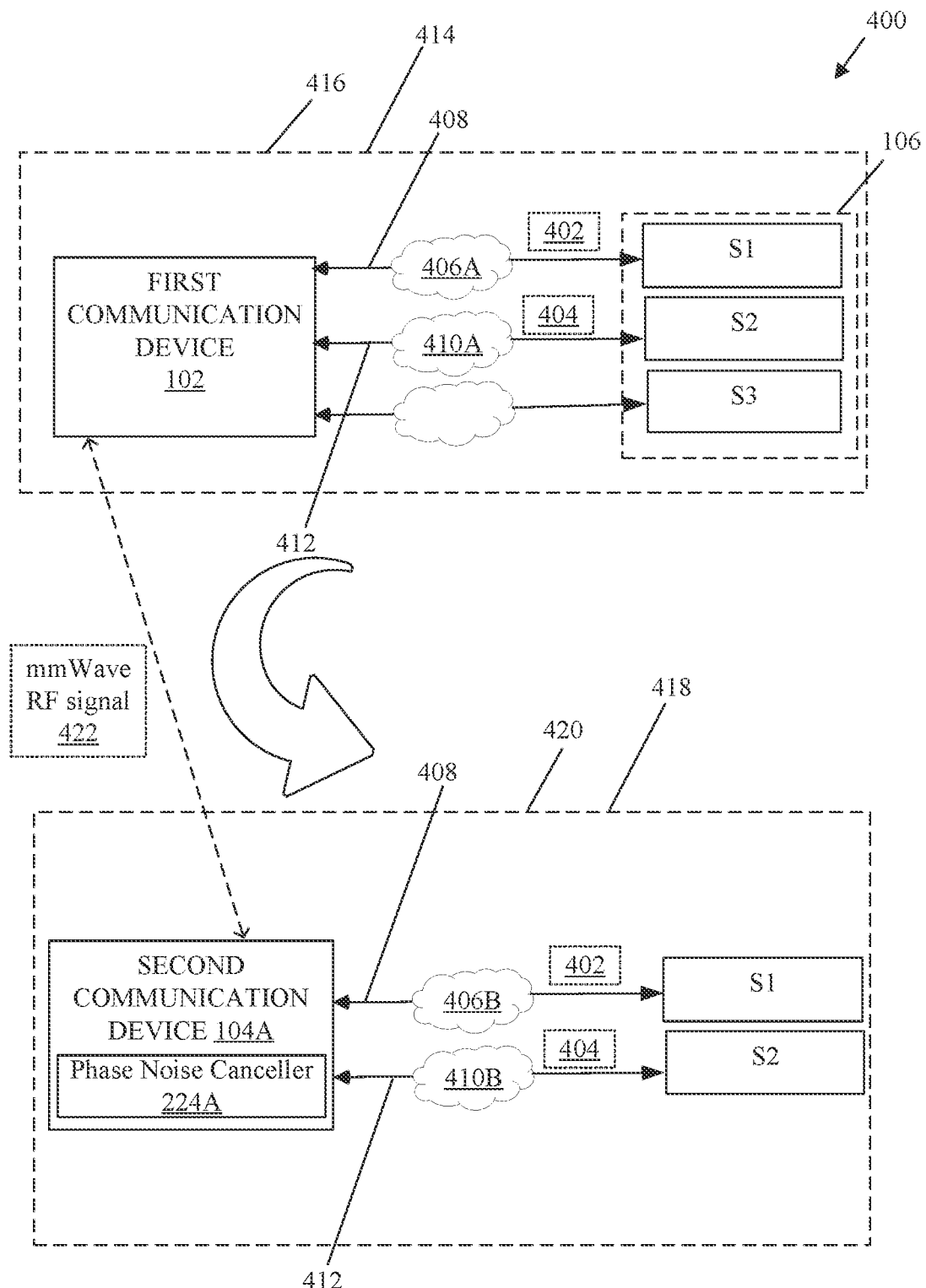
FIG. 4 is a diagram illustrating an exemplary scenario for implementation of phase noise removal in a network of wireless RF repeaters for a noise-free and an always-connected experience, in accordance with an exemplary embodiment of the disclosure.

FIG. 4 is a diagram illustrating an exemplary scenario for implementation of phase noise removal in a network of wireless RF repeaters for a noise-free and an always-connected experience, in accordance with an exemplary embodiment of the disclosure. FIG. 4 is explained in conjunction with elements from FIGS. 1, 2A, 2B, and 3. With reference to FIG. 4, there is shown an exemplary scenario 400 of the network of wireless RF repeaters 100. The exemplary scenario 400 includes the first communication device 102, the plurality of communication systems 106, and the second communication device 104A. There is further shown a first content item 402 and a second content item 404.

In accordance with an embodiment, the DSP 206 of the first communication device 102 may be configured to communicate the first content item 402 (e.g. a data item) to a first communication system S1 of the plurality of communication systems 106 via a first wireless network 406A (e.g. a Bluetooth Network) associated with a first protocol 408 (e.g. Bluetooth protocol). The DSP 206 of the first communication device 102 may be further configured to communicate the second content item 404 (e.g. a video) to a second communication system S2 of the plurality of communication systems 106 via a second wireless network 410A (e.g. Wi-Fi network) associated with a second protocol 412 (e.g. Wi-Fi protocol) within a first physical area 414 (e.g. a first room) at a first location 416.

In accordance with the exemplary scenario 400, the first communication system S1 and the second communication system S2 may move to a second physical area 418 (e.g. a second room) at a second location 420. In an example, the second physical area 418 may be more than 600 meters from the first physical area 414. Alternatively stated, the second physical area 418 may be beyond the usual communication range of the first wireless network 406 (e.g. beyond 100 meters) associated with the first protocol 408 (e.g. the Bluetooth protocol) and the second wireless network 410 (beyond 150 feet) associated with the second protocol 412 (e.g. Wi-Fi protocol) from the first communication device 102. In such a case, the first communication system S1 may continue to receive the first content item 402 (i.e. the data item) uninterruptedly from the second communication device 104A at the second physical area 418 (i.e. the second room) at the second location 420. Similarly, the second communication system S2 may continue to receive the second content item 404 (i.e. the video) uninterruptedly from the second communication device 104A at the second physical area 418 (i.e. the second room) at the second location 420. In other words, both the first communication system S1 and the second communication system S2 may be communicatively coupled over different wireless network (i.e. the Bluetooth and the Wi-Fi network in this case) with the same device, such as the second communication device 104A, via which MIMO communication is established to continue receiving respective content items, such as the first content item 402 and the second content item 404.

Based on a mmWave RF signal 422 of the specified frequency received from the first communication device 102, the second communication device 104A communicates the first content item 402 to the first communication system S1 via a third wireless network 406B (e.g. the Bluetooth Network) associated with the first protocol 408 (i.e. the Bluetooth protocol). Similarly, based on the mmWave RF signal 422 of the specified frequency received from the first communication device 102, the second communication device 104A is able to communicate the second content item 404 to the second communication system S2 via a fourth wireless network 410B (i.e. a Wi-Fi network) associated with the second protocol 412 (i.e. WI-FI protocol) within the second physical area 418 (i.e. the second room) at the second location 420 when the first communication system S1 and the second communication system S2 are moved to the second physical area 418 (i.e. the second room) at the second location 420. The first content item 402 may be carried over a first RF signal of the plurality of RF signals present in the mmWave RF signal 422. The second content item 404 may be carried over a second RF signal of the plurality of RF signals present in the mmWave RF signal 422. Thus, the two different RF signals of the plurality of RF signals that carries the first content item 402 and the second content item 404 may be retrieved at the second communication device 104A based on the mmWave RF signal 422 of the specified frequency (e.g. 60 GHz) received from the first communication device 102 (and phase noise in the first RF signal and the second RF signal are removed using a reference of a pilot tone in the mmWave RF signal 422 by the phase noise canceller 224A (FIG. 2B)). Thus, the disclosed network of wireless RF repeaters 100 provides a noise-free and an always-connected experience as a result of its multiprotocol feature. The multiprotocol feature of the network of wireless RF repeaters 100 provides a capability to the first communication device 102 and the second communication device 104A to handle different wireless communication protocols concurrently in terms of extending their range as well as increasing bandwidth and reducing latency concurrently while at least reducing (or even removing) phase noise in the network of wireless RF repeaters 100 for high performance wireless content communication.

Figure 5A:
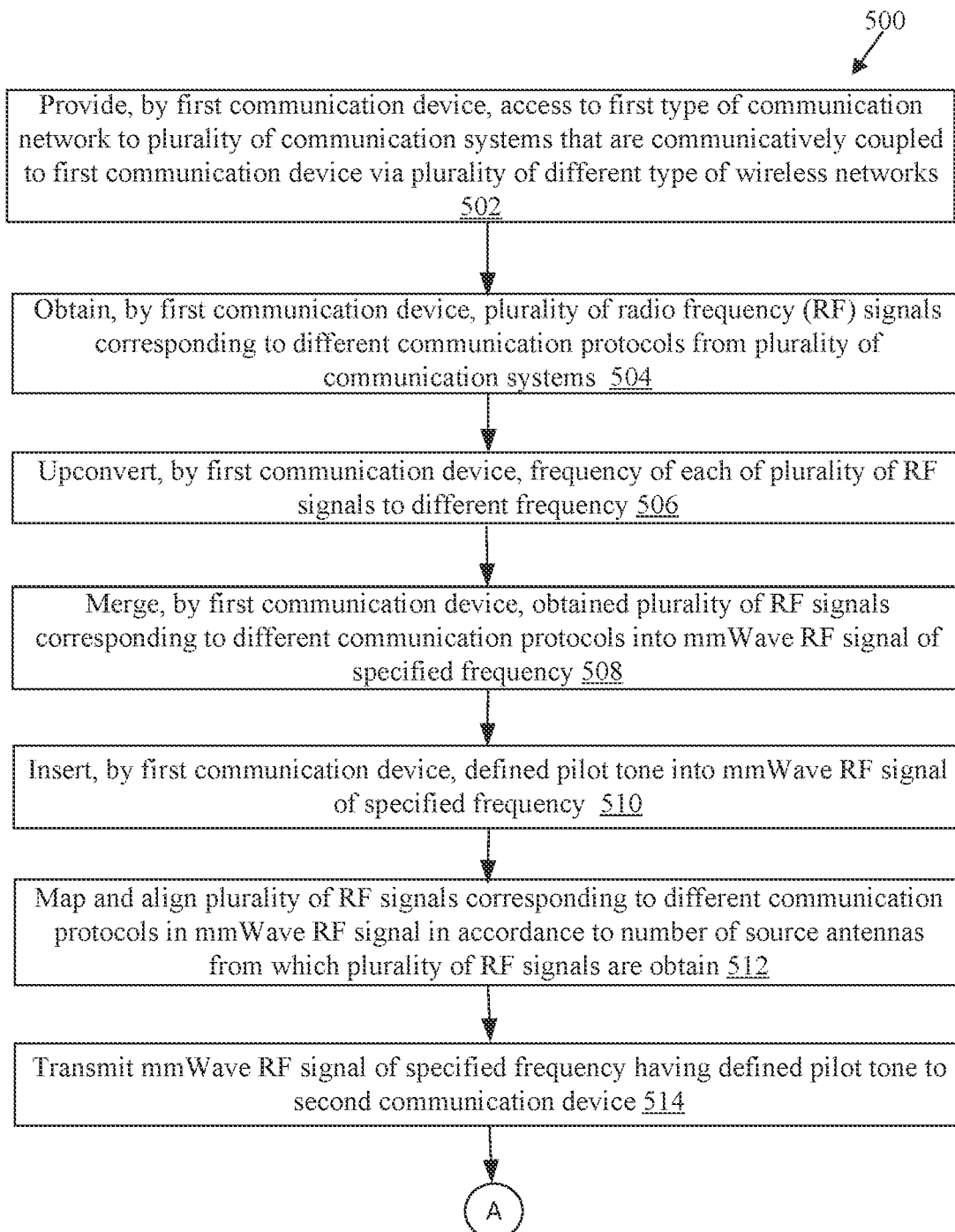
FIG. 5A and FIG. 5B, collectively, is a flowchart that illustrates an exemplary phase noise removal in a network of wireless RF repeaters, in accordance with an embodiment of the disclosure.
Figure 5B:
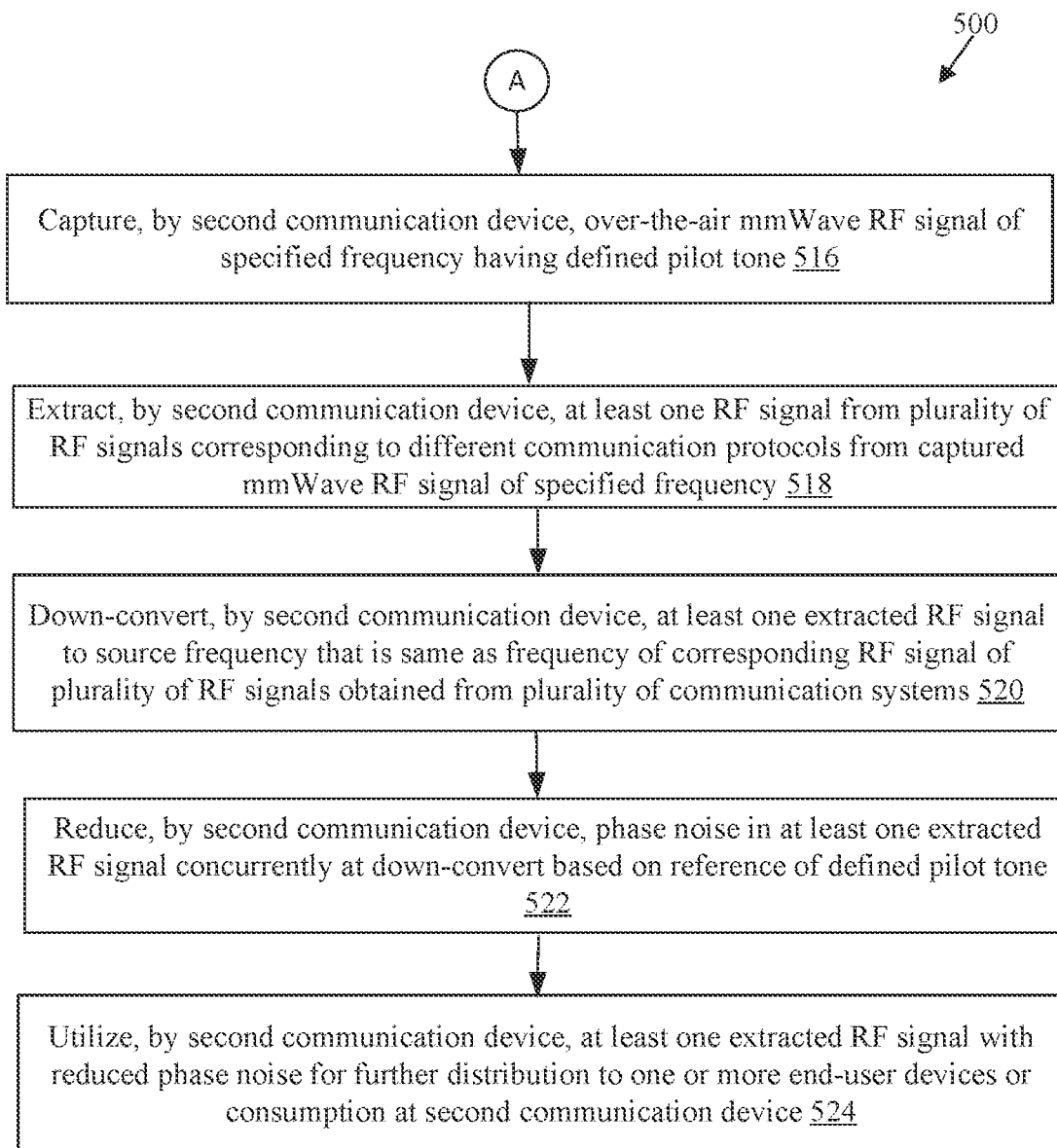

FIG. 5A and FIG. 5B, collectively, is a flowchart that illustrates an exemplary phase noise removal in a network of wireless RF repeaters, in accordance with an embodiment of the disclosure. FIGS. 5A and 5B are explained in conjunction with elements from FIGS. 1, 2A, 2B, 3, and 4. With reference to FIGS. 5A and 5B, there is shown a flowchart 500 comprising exemplary operations 502 through 524.

At 502, an access to a first type of communication network 108 may be provided by the first communication device 102 to the plurality of communication systems 106 that are communicatively coupled to the first communication device 102 via the plurality of different type of wireless networks 110. The DSP 206 may be configured to provide the access to the first type of communication network to the plurality of communication systems 106.

At 504, a plurality of radio frequency (RF) signals corresponding to different communication protocols may be obtained by the first communication device 102 from the plurality of communication systems 106. The receiver circuitry 212 may be configured to obtain the plurality of radio frequency (RF) signals corresponding to different communication protocols via the plurality of different type of wireless networks 110.

At 506, a frequency of each of the plurality of RF signals may be upconverted to a different frequency by the first communication device 102. The upconverter 214 may be configured to upconvert the frequency of each of the plurality of RF signals to a different frequency. The upconversion introduces a phase noise in the plurality of RF signals.

At 508, the obtained plurality of RF signals corresponding to different communication protocols are merged into a mmWave RF signal of a specified frequency by the first communication device 102. The multiprotocol combiner circuit 216 may be configured to multiplex the obtained plurality of RF signals corresponding to different communication protocols are merged into the mmWave RF signal.

At 510, a defined pilot tone may be inserted into the mmWave RF signal of the specified frequency by the first communication device 102. The DSP 206 may be further configured to insert the defined pilot tone into the mmWave RF signal of the specified frequency. In an implementation, a plurality of pilot tones may be inserted for each of the plurality of RF signals in the mmWave RF signal.

At 512, the plurality of RF signals corresponding to different communication protocols are mapped and aligned, by the first communication device 102, in the mmWave RF signal in accordance to a number of source antennas from which the plurality of RF signals are obtained. The DSP 206 may be configured to map and align the plurality of RF signals corresponding to different communication protocols in the mmWave RF signal in accordance to a number of source antennas from which the plurality of RF signals are obtained. The defined pilot tone may also be aligned and inserted in the mmWave RF signal at the time of merge of the plurality of signals.

At 514, the mmWave RF signal of the specified frequency having the defined pilot tone may be transmitted to the second communication device 104A by the first communication device 102. The transmitter circuitry 218 may be configured to transmit the mmWave RF signal of the specified frequency having the defined pilot tone to the second communication device 104A. Each of the plurality of RF signals communicated over a corresponding type of wireless network of the plurality of different type of wireless networks 110 has a defined communication range. The DSP 206 may be configured to extend a coverage of the plurality of RF signals corresponding to the different communication protocols beyond the defined communication range based on the transmit of the mmWave RF signal of the specified frequency that includes the plurality of RF signals and the defined pilot tone. In an implementation, the method further includes providing the mmWave RF signal of the specified frequency to the plurality of second communication devices 104A to 104N in a chain transmission or a parallel transmission. At least one of the merged plurality of RF signals may be extracted from the mmWave signal at each of the plurality of second communication devices 104A to 104N.

At 516, the mmWave RF signal of the specified frequency having the defined pilot tone may be captured over-the-air by the second communication device 104A. The receiver circuitry 230 may be configured to capture the transmitted mmWave RF signal of the specified frequency having the defined pilot tone over-the-air.

At 518, at least one RF signal may be extracted by the second communication device 104A from the plurality of RF signals corresponding to different communication protocols from the captured mmWave RF signal of the specified frequency. The control circuitry 224 may be configured to extract one or more RF signals corresponding to different communication protocols from the captured mmWave RF signal.

At 520, at least the one extracted RF signal may be down converted by the second communication device 104A to a source frequency that is same as the frequency of a corresponding RF signal of the plurality of RF signals obtained from the plurality of communication systems 106. The downconverter 232 may be configured to down convert the at least the one extracted RF signal to its original frequency.

At 522, a phase noise in at least the one extracted RF signal may be concurrently reduced by the second communication device 104A at the down conversion based on a reference of the defined pilot tone. The phase noise canceller 224A may be configured to estimate the phase noise in at least the one extracted RF signal based on a reference of the defined pilot tone. For example, as the signal characteristics of the defined pilot tone is distinct and known, the phase difference detected for the pilot tone, is used as reference to subtract the phase noise from the one extracted RF signal when such extracted RF signal is in frequency domain, to remove or at least significantly reduce the phase noise. In a case where the extracted RF signal is in time domain, the estimated phase noise may be multiplied to the extracted RF signal.

At 524, at least the one extracted RF signal with reduced phase noise may be utilized by the second communication device 104A for further distribution to one or more end-user devices, such as the end-user device 318. The transmitter circuitry 236 may be configured to utilize the at least the one extracted RF signal with reduced phase noise for further distribution to one or more end-user devices, such as the end-user device 318, for example, for MIMO communication.

Various embodiments of the disclosure may provide a non-transitory computer-readable medium having stored thereon, computer implemented instructions that when executed by a computer causes a communication apparatus to execute operations, the operations comprising obtaining, by the first communication device 102, a plurality of radio frequency (RF) signals corresponding to different communication protocols from the plurality of communication systems 106. The operations may further comprise upconverting, by the first communication device 102, a frequency of each of the plurality of RF signals to a different frequency, wherein the upconversion introduces a phase noise in the plurality of RF signals. The operations may further comprise merging, by the first communication device 102, the plurality of RF signals corresponding to different communication protocols into a mmWave RF signal of a specified frequency; and inserting, by the first communication device 102, a defined pilot tone into the mmWave RF signal of the specified frequency. The operations may further comprise transmitting, by the first communication device 102, the mmWave RF signal of the specified frequency having the defined pilot tone to a second communication device 104A; and capturing, by the second communication device 104A, the mmWave RF signal of the specified frequency having the defined pilot tone over-the-air. The operations may further comprise extracting, by the second communication device 104A, at least one RF signal from the plurality of RF signals corresponding to different communication protocols from the captured mmWave RF signal of the specified frequency; and down-converting, by the second communication device 104A, at least the one extracted RF signal to a source frequency that is same as the frequency of a corresponding RF signal of the plurality of RF signals obtained from the plurality of communication systems 106. The operations may further comprise reducing, by the second communication device 104A, the phase noise in at least the one extracted RF signal concurrently at the down-convert based on a reference of the defined pilot tone; and utilizing, by the second communication device 104A, at least the one extracted RF signal with reduced phase noise for further distribution to one or more end-user devices or consumption at the second communication device 104A.

Various embodiments of the disclosure may provide the network of wireless RF repeaters 100 (FIG. 1). The network of wireless RF repeaters 100 includes the first communication device 102 (FIG. 1) and the second communication device 104A (FIG. 1). The first communication device 102 comprises a digital signal processor (such as the DSP 206) that is configured to obtain a plurality of radio frequency (RF) signals corresponding to different communication protocols from a plurality of communication systems 106. The DSP 206 (or the upconverter 214) may be further configured to upconvert a frequency of each of the plurality of RF signals to a different frequency, wherein the upconversion introduces a phase noise in the plurality of RF signals. The DSP 206 may be further configured to merge the plurality of RF signals corresponding to different communication protocols into a mmWave RF signal of a specified frequency; insert a defined pilot tone into the mmWave RF signal of the specified frequency, and transmit the mmWave RF signal of the specified frequency having the defined pilot tone to the second communication device 104A. The second communication device 104A is configured to capture the mmWave RF signal of the specified frequency having the defined pilot tone over-the-air; and extract at least one RF signal from the plurality of RF signals corresponding to different communication protocols from the captured mmWave RF signal of the specified frequency. The second communication device 104A may be further configured to down-convert at least the one extracted RF signal to a source frequency that is same as the frequency of a corresponding RF signal of the plurality of RF signals obtained from the plurality of communication systems 106. The second communication device 104A may be further configured to reduce the phase noise in at least the one extracted RF signal concurrently at the down-convert based on a reference of the defined pilot tone; and utilize at least the one extracted RF signal with reduced phase noise for further distribution to one or more end-user devices.

In accordance with an embodiment, the DSP 206 is further configured to provide access to the first type of communication network 108 to the plurality of communication systems 106 that are communicatively coupled to the first communication device 102 via the plurality of different type of wireless networks 110. The plurality of different type of wireless networks correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network. Each of the plurality of RF signals communicated over a corresponding type of wireless network of the plurality of different type of wireless networks 110 has a defined communication range, wherein a coverage of the plurality of RF signals corresponding to the different communication protocols is extended beyond the defined communication range based on the transmit of the mmWave RF signal of the specified frequency that includes the plurality of RF signals.

In accordance with an embodiment, the different communication protocols correspond to a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), or wireless personal area network (WPAN) protocols. The DSP 206 may be further configured to map and align the plurality of RF signals corresponding to different communication protocols in the mmWave RF signal in accordance to a number of source antennas from which the plurality of RF signals are obtained. The DSP 206 may be further configured to provide the mmWave RF signal of the specified frequency to the plurality of second communication devices 104A to 104N in a chain transmission or a parallel transmission, wherein each second communication device of the plurality of second communication devices 104A to 104N may be configured to extract, from the mmWave RF signal, one or more of the merged plurality of RF signals.

In accordance with an embodiment, the second communication device 104A may be further configured to extract, from the transmitted mmWave RF signal, a wireless wide area network signal, a wireless local area network signal, a wireless personal area network signal, or a combination thereof that corresponds to the plurality of RF signals. The DSP 206 of the first communication device 102 may be further configured to communicate a first content item to a first communication system of the plurality of communication systems 106 via a first wireless network associated with a first protocol, and a second content item to a second communication system of the plurality of communication systems 106 via a second wireless network associated with a second protocol within a first physical area at a first location. The second communication device 104A may be further configured to communicate the first content item to the first communication system via a third wireless network associated with the first protocol, and the second content item to the second communication system via a fourth wireless network associated with the second protocol within a second physical area at a second location when the first communication system and the second communication system are moved to the second physical area at the second location. zTwo different RF signals of the plurality of RF signals that carries the first content item and the second content item are retrieved at the second communication device 104A based on the mmWave RF signal of the specified frequency received from the first communication device 102.

In accordance with an embodiment, the first communication device 102 and the second communication device 104A is one of a fifth generation (5G) modem, a 5G wireless access point, a multiprotocol wireless range extender device, an evolved-universal terrestrial radio access-new radio (NR) dual connectivity (EN-DC) device, a NR-enabled repeater device, a NR-enabled repeater device, a wireless local area network-enabled device, a wireless personal area network-enabled device, a mmWave-enabled device, or a 60 gigahertz (GHz) capable device. In an implementation, the specified frequency of the mmWave RF signal is in the range of 10 gigahertz (GHz) to 300 GHz. In another implementation, the specified frequency of the mmWave RF signal is in the range of 55 gigahertz (GHz) to 65 GHz. In yet another implementation, the specified frequency of the mmWave RF signal is 60 gigahertz (GHz).

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. An wireless communication system, comprising:
a first communication device and a second communication device, wherein the first communication device comprises a digital signal processor that is configured to:
  obtain a plurality of radio frequency (RF) signals corresponding to different communication protocols from a plurality of communication systems;
  upconvert a frequency of each of the plurality of RF signals to a different frequency, wherein the upconversion introduces a phase noise in the plurality of RF signals;
  multiplex the plurality of RF signals corresponding to different communication protocols into a mmWave RF signal of a specified frequency; and
  transmit the mmWave RF signal of the specified frequency along with a defined pilot tone to the second communication device, wherein the second communication device is configured to:
  capture over-the-air the mmWave RF signal of the specified frequency having the defined pilot tone;
  extract at least one RF signal from the plurality of RF signals corresponding to the different communication protocols from the captured mmWave RF signal of the specified frequency;
  estimate phase-noise in the at least one extracted RF signal from the plurality of RF signals,
  wherein the phase noise is estimated based on an amount of deviation in one or more signal characteristics of the defined pilot tone present in the captured mmWave RF signal;
  down-convert the at least one extracted RF signal to a source frequency that is same as the frequency of a corresponding RF signal of the plurality of RF signals obtained from the plurality of communication systems;
  reduce the phase noise in at least the one extracted RF signal concurrently at the down-convert based on the phase noise estimated in the at least one extracted RF signal; and
  utilize the at least one extracted RF signal with reduced phase noise for further distribution to one or more end-user devices.

2. The wireless communication system according to claim 1, wherein the digital signal processor is further configured to provide access to a first type of communication network to the plurality of communication systems that are communicatively coupled to the first communication device via a plurality of different type of wireless networks.

3. The wireless communication system according to claim 2, wherein the plurality of different type of wireless networks correspond to a Wireless-Fidelity (Wi-Fi) network, a Bluetooth network, a Bluetooth low energy (BLE) network, a Zigbee network, a cellular network, an infrared communication network, a radio frequency for consumer electronics (RF4CE) network, a wireless sensor network, or an Internet-of-Things network.

4. The wireless communication system according to claim 2, wherein each of the plurality of RF signals communicated over a corresponding type of wireless network of the plurality of different type of wireless networks has a defined communication range, wherein a coverage of the plurality of RF signals corresponding to the different communication protocols is extended beyond the defined communication range based on the transmit of the mmWave RF signal of the specified frequency that includes the plurality of RF signals.

5. The wireless communication system according to claim 1, wherein the different communication protocols correspond to a Wireless-Fidelity (Wi-Fi) protocol, a Bluetooth Protocol, a Bluetooth low energy (BLE) protocol, a Zigbee protocol, a cellular communication protocol, an infrared communication protocol, a radio frequency for consumer electronics (RF4CE) protocol, a wireless sensor network protocol, or different variations of wireless wide area network (WWAN), wireless local area network (WLAN), or wireless personal area network (WPAN) protocols.

6. The wireless communication system according to claim 1, wherein the digital signal processor is further configured to map and align the plurality of RF signals corresponding to the different communication protocols in the mmWave RF signal in accordance to a number of source antennas from which the plurality of RF signals are obtained.

7. The wireless communication system according to claim 1, wherein the digital signal processor is further configured to provide the mmWave RF signal of the specified frequency to a plurality of second communication devices in a chain transmission or a parallel transmission, wherein each of the second communication device of the plurality of second communication devices is configured to extract, from the mmWave RF signal, one or more of the multiplexed plurality of RF signals.

8. The wireless communication system according to claim 1, wherein the second communication device is further configured to extract, from the transmitted mmWave RF signal, a wireless wide area network signal, a wireless local area network signal, a wireless personal area network signal, or a combination thereof that corresponds to the plurality of RF signals.

9. The wireless communication system according to claim 1, wherein the digital signal processor of the first communication device is further configured to communicate a first content item to a first communication system of the plurality of communication systems via a first wireless network associated with a first protocol, and a second content item to a second communication system of the plurality of communication systems via a second wireless network associated with a second protocol within a first physical area at a first location.

10. The wireless communication system according to claim 9, wherein the second communication device is further configured to communicate the first content item to the first communication system via a third wireless network associated with the first protocol, and the second content item to the second communication system via a fourth wireless network associated with the second protocol within a second physical area at a second location when the first communication system and the second communication system are moved to the second physical area at the second location, wherein two different RF signals of the plurality of RF signals that carries the first content item and the second content item are retrieved at the second communication device based on the mmWave RF signal of the specified frequency received from the first communication device.

11. The wireless communication system according to claim 1, wherein the first communication device and the second communication device is one of: a fifth generation (5G) modem, a 5G wireless access point, a multiprotocol wireless range extender device, an evolved-universal terrestrial radio access-new radio (NR) dual connectivity (EN-DC) device, a NR-enabled repeater device, a NR-enabled repeater device, a wireless local area network-enabled device, a wireless personal area network-enabled device, a mmWave-enabled device, or a 60 gigahertz (GHz) capable device.

12. The wireless communication system according to claim 1, wherein the specified frequency of the mmWave RF signal is in a range of 10 gigahertz (GHz) to 300 GHz.

13. The wireless communication system according to claim 1, wherein the specified frequency of the mmWave RF signal is in a range of 55 gigahertz (GHz) to 65 GHz.

14. The wireless communication system according to claim 1, wherein the specified frequency of the mmWave RF signal is 60 gigahertz (GHz).

15. An wireless communication method, comprising:
obtaining, by a first communication device, a plurality of radio frequency (RF) signals corresponding to different communication protocols from a plurality of communication systems;
upconverting, by the first communication device, a frequency of each of the plurality of RF signals to a different frequency, wherein the upconversion introduces a phase noise in the plurality of RF signals;
multiplexing, by the first communication device, the plurality of RF signals corresponding to the different communication protocols into a mmWave RF signal of a specified frequency; and
transmitting, by the first communication device, the mmWave RF signal of the specified frequency along with a defined pilot tone to a second communication device;
capturing, by the second communication device, over-the-air the mmWave RF signal of the specified frequency having the defined pilot tone;
extracting, by the second communication device, at least one RF signal from the plurality of RF signals corresponding to the different communication protocols from the mmWave RF signal of the specified frequency;
estimating phase-noise in the at least one extracted RF signal from the plurality of RF signals,
wherein the phase noise is estimated based on an amount of deviation in one or more signal characteristics of the defined pilot tone present in the captured mmWave RF signal;
down-converting, by the second communication device, the at least one extracted RF signal to a source frequency that is same as the frequency of a corresponding RF signal of the plurality of RF signals obtained from the plurality of communication systems;
reducing, by the second communication device, the phase noise in at least the one extracted RF signal concurrently at the down-convert based on the phase noise estimated in the at least one extracted RF signal; and
utilizing, by the second communication device, the at least one extracted RF signal with reduced phase noise for further distribution to one or more end-user devices or consumption at the second communication device.

16. The wireless communication method according to claim 15, further comprising providing access, by the first communication device, to a first type of communication network to the plurality of communication systems that are communicatively coupled to the first communication device via a plurality of different type of wireless networks.

17. The wireless communication method according to claim 15, further comprising mapping and aligning, by the first communication device, the plurality of RF signals corresponding to the different communication protocols in the mmWave RF signal in accordance to a number of source antennas from which the plurality of RF signals are obtained.

18. The wireless communication method according to claim 15, further comprising communicating, by the first communication device, a first content item to a first communication system of the plurality of communication systems via a first wireless network associated with a first protocol, and a second content item to a second communication system of the plurality of communication systems via a second wireless network associated with a second protocol within a first physical area at a first location.

19. The wireless communication method according to claim 18, further comprising communicating, by the second communication device, the first content item to the first communication system via a third wireless network associated with the first protocol, and the second content item to the second communication system via a fourth wireless network associated with the second protocol within a second physical area at a second location when the first communication system and the second communication system are moved to the second physical area at the second location, wherein two different RF signals of the plurality of RF signals that carries the first content item and the second content item are retrieved at the second communication device based on the mmWave RF signal of the specified frequency received from the first communication device.

20. A non-transitory computer-readable medium having stored thereon, computer implemented instructions that when executed by a computer in a communication apparatus causes the communication apparatus to execute operations, the operations comprising:
 obtaining, by a first communication device, a plurality of radio frequency (RF) signals corresponding to different communication protocols from a plurality of communication systems;
 upconverting, by the first communication device, a frequency of each of the plurality of RF signals to a different frequency, wherein the upconversion introduces a phase noise in the plurality of RF signals;
 multiplexing, by the first communication device, the plurality of RF signals corresponding to the different communication protocols into a mmWave RF signal of a specified frequency; and
 transmitting, by the first communication device, the mmWave RF signal of the specified frequency along with a defined pilot tone to a second communication device;
 capturing, by the second communication device, over-the-air the mmWave RF signal of the specified frequency having the defined pilot tone;
 extracting, by the second communication device, at least one RF signal from the plurality of RF signals corresponding to the different communication protocols from the mmWave RF signal of the specified frequency;
 estimating phase-noise in the at least one extracted RF signal from the plurality of RF signals,
 wherein the phase noise is estimated based on an amount of deviation in one or more signal characteristics of the defined pilot tone present in the captured mmWave RF signal;
 down-converting, by the second communication device, the at least one extracted RF signal to a source frequency that is same as the frequency of a corresponding RF signal of the plurality of RF signals obtained from the plurality of communication systems;
 reducing, by the second communication device, the phase noise in the at least one extracted RF signal concurrently at the down-convert based on the phase noise estimated in the at least one extracted RF signal; and
 utilizing, by the second communication device, the at least one extracted RF signal with reduced phase noise for further distribution to one or more end-user devices or consumption at the second communication device.

\* \* \* \* \*